(12) United States Patent
Kurkal-Siebert et al.

(10) Patent No.: US 9,701,891 B2
(45) Date of Patent: Jul. 11, 2017

(54) METHOD OF FRACTURING A SUBTERRANEAN FORMATION WITH USE FLOWBACK AIDS

(71) Applicants: BASF SE, Ludwigshafen (DE); BASF Corporation, Florham Park, NJ (US)

(72) Inventors: Vandana Kurkal-Siebert, Heidelberg (DE); Jack Tinsley, Houston, TX (US); Tanhee Galindo, Spring, TX (US); Rimassa Shawn, Katy, TX (US)

(73) Assignees: BASF SE, Ludwigshafen (DE); BASF Corporation, Florham Park, NJ (US)

( * ) Notice: Subject to any disclaimer, the term of this patent is extended or adjusted under 35 U.S.C. 154(b) by 0 days.

(21) Appl. No.: 14/760,725

(22) PCT Filed: Jan. 3, 2014

(86) PCT No.: PCT/EP2014/050034
§ 371 (c)(1),
(2) Date: Jul. 14, 2015

(87) PCT Pub. No.: WO2014/108350
PCT Pub. Date: Jul. 17, 2014

(65) Prior Publication Data
US 2015/0353815 A1 Dec. 10, 2015

Related U.S. Application Data

(60) Provisional application No. 61/751,962, filed on Jan. 14, 2013.

(51) Int. Cl.
| | | |
|---|---|---|
| *E21B 43/26* | (2006.01) | |
| *C09K 8/68* | (2006.01) | |
| *C09K 8/80* | (2006.01) | |
| *E21B 43/267* | (2006.01) | |
| *C09K 8/86* | (2006.01) | |

(52) U.S. Cl.
CPC ............ *C09K 8/68* (2013.01); *C09K 8/80* (2013.01); *C09K 8/86* (2013.01); *E21B 43/26* (2013.01); *E21B 43/267* (2013.01)

(58) Field of Classification Search
CPC .... C09K 8/68; C09K 8/80; C09K 8/86; E21B 43/26; E21B 43/267
USPC ......... 166/308.1, 280.2, 305.1, 308.2, 250.1, 166/244.1, 300
See application file for complete search history.

(56) References Cited

U.S. PATENT DOCUMENTS

| | | | |
|---|---|---|---|
| 5,003,057 A | 3/1991 | McCurry et al. | |
| 5,964,295 A | 10/1999 | Brown et al. | |
| 6,972,274 B1* | 12/2005 | Slikta | C09K 8/52 166/270 |
| 7,241,875 B2 | 7/2007 | Schmid et al. | |
| 7,288,528 B2 | 10/2007 | Frick et al. | |
| 7,998,911 B1 | 8/2011 | Berger et al. | |
| 2004/0019199 A1* | 1/2004 | Crews | C09K 8/68 536/124 |
| 2006/0046948 A1* | 3/2006 | Tang | B01F 17/0092 510/470 |
| 2007/0062702 A1 | 3/2007 | Walters et al. | |
| 2008/0011486 A1* | 1/2008 | Zhang | C09K 8/38 166/308.6 |
| 2008/0261835 A1* | 10/2008 | Berger | C09K 8/584 507/244 |
| 2011/0071057 A1* | 3/2011 | Weerasooriya | C07D 301/00 507/219 |
| 2011/0174492 A1* | 7/2011 | Robb | C09K 8/524 166/308.2 |
| 2011/0218126 A1 | 9/2011 | Berger et al. | |

FOREIGN PATENT DOCUMENTS

| | | | | |
|---|---|---|---|---|
| CH | WO 2013186110 A1 * | 12/2013 | ............ | C09K 8/584 |
| WO | WO-97/42299 A1 | 11/1997 | | |
| WO | WO-0109153 A1 | 2/2001 | | |
| WO | WO-02090369 A2 | 11/2002 | | |
| WO | WO-2004/052902 A1 | 6/2004 | | |
| WO | WO-2006/026732 A1 | 3/2006 | | |
| WO | WO-2007/063069 A2 | 6/2007 | | |
| WO | WO-2011/012164 A1 | 2/2011 | | |
| WO | WO-2011/038745 A1 | 4/2011 | | |
| WO | WO-2011088556 A1 | 7/2011 | | |
| WO | WO-2013174679 A1 | 11/2013 | | |

OTHER PUBLICATIONS

Cawiezel, K., et al., "The Selection and Optimization of a Surfactant Package to Maximize Cleanup of a High-Density Fracturing Fluid", Paper for Presentation at Society of Petroleum Engineers Deepwater Drilling and Completions Conference, SPE 136812, (2010), pp. 1-11.
Howard, P., et al., "Comparison of Flowback Aids: Understanding Their Capillary Pressure and Wetting Properties", SPE Productions & Operations, (2010), pp. 376-387.
Penny, G., et al., "Field Studies of Drilling and Completion Fluids to Minimize Damage and Enhance Gas Production in Unconventional Reservoirs", Paper for Presentation at Society of Petroleum Engineers European Formation Damage Conference, SPE 107844, (2007), pp. 1-11.
International Search Report for PCT/EP2014/050034 mailed Apr. 23, 2014.

* cited by examiner

*Primary Examiner* — Silvana Runyan
(74) *Attorney, Agent, or Firm* — Drinker Biddle & Reath LLP (57) ABSTRACT

Method of fracturing subterranean formations using aqueous compositions comprising at least an aqueous base fluid, proppants, a viscosifier, at least one flowback aid and removing at least a portion of the aqueous fracturing fluid from the formation after fracturing. The flowback aid is selected from the group of alkyl or alkenyl polyglucosides, carboxylated alkyl or alkenyl polyglucosides and alkoxylated branched alcohols.

20 Claims, 1 Drawing Sheet

METHOD OF FRACTURING A SUBTERRANEAN FORMATION WITH USE FLOWBACK AIDS

CROSS-REFERENCE TO RELATED APPLICATIONS

This application is a national stage application (under 35 U.S.C. §371) of PCT/EP2014/050034, filed Jan. 3, 2014, which claims benefit of U.S. provisional application No. 61/751,962, filed Jan. 14, 2013, both applications of which are incorporated herein by reference in their entirety.

The present invention relates to a method of fracturing subterranean formations using aqueous compositions comprising at least an aqueous base fluid, proppants, a viscosifier, at least one flowback aid and removing at least a portion of the aqueous fracturing fluid from the formation after fracturing. The flowback aid is selected from the group of alkyl or alkenyl polyglucosides, carboxylated alkyl or alkenyl polyglucosides and alkoxylated branched alcohols.

BACKGROUND OF THE INVENTION

In the oil and gas industry, hydraulic fracturing involves injecting fracturing fluid through a wellbore and into a formation under sufficiently high pressure to create fractures, thereby providing channels through which formation fluids such as oil, gas or water, can flow into the wellbore and thereafter be withdrawn. Fracturing fluids are designed to enable the initiation or extension of fractures and the simultaneous transport of suspended proppant (for example, naturally-occurring sand grains, resin-coated sand, sintered bauxite, glass beads, ultra lightweight polymer beads and the like) into the fracture to keep the fracture open when the pressure is released.

Water or hydrocarbons have been commonly used as base fluids for fracturing. While usually effective, water based fluids can be harmful to certain types of formations, and are not effective at removing excess water from a well (removing "water blocks"). The recovery and retention of the injected aqueous fluids have proven to be important parameters affecting the productivity of the pay zone. Insufficient recovery of injected aqueous fluid may significantly lower the productivity.

Therefore, it has been suggested to use chemical additives to optimize clean-up and recovery of aqueous fracturing fluids. Flowback aids are usually surfactants or cosolvents added to stimulation treatment fluids to reduce capillary pressure and remove water blocks. As the stimulation of tight gas reservoirs is becoming more important, the perceived value of these additives has grown. The flowback aid benefits production by reducing damage due to phase trapping, enhance mobilization of the oil and gas, help to increase regained permeability, and improve oil/gas recovery.

Historically, fluorosurfactants have provided a good combination of surface tension reduction and fluid recovery (L. Kalfayan, B. Haley, and Weiss "Optimizing surfactants to improve stimulation flowback in tight gas wells", World Oil, Nov. 1, 2008). However, environmental concerns about fluorosurfactants and their potential degradation products led to the search for alternatives.

Glen Penny and John T. Pursly "Field studies of drilling and completion fluids to minimize damage and enhance gas production in unconventional reservoirs", Socienty of Petroleum Engineers, SPE 107844-MS, 2007 disclose the use of nonionic alcohol ethoxylates, nonylphenol ethoxylates, mixtures of methanol and fluorosurfactants and of microemulsions for drilling and completion fluids but also for fracturing processes.

Paul R. Howard, Sumitra Mukhopadhyay, Nita Moniaga, Laura Schafer, Glen Penny, and Keith Dismuke "Comparison of Flowback Aids Understanding their capillary pressure and wetting properties", Socienty of Petroleum Engineers, SPE 122307-MS, 2009 disclose the use of linear ethoxylated alkohols, micoemulsions, amine oxides, and isoalkylalcohols as flowback aids.

P. Kaufman et al. "Critical Evaluations of Additives Used in Shale Slickwater Fracs"; Society of Petroleum Engineers, SPE 119900, SPE Shale Gas Production Conference, Irving, Tex. disclose ethoxylated n-decanol, a microemulsion, nonyl phenol ethoxylated and ethoxylated fluorosurfactants for shale treatment to lower surface tension.

K. E. Cawiezel, A. K. Singh, P. S. Carman, J. L. Cutler, "The Selection and Optimization of a Surfactant Package to Maximize Cleanup of a High-Density Fracturing Fluid" in SPE 136812-MS 2010, SPE Deepwater Drilling and Completions Conference, Galveston, Tex. disclose test methods for the selection of surfactants for recovering fracturing fluids. The paper also discloses results for several surfactants but does not disclose any details about the chemistry of such surfactants.

Mohan K. R. Pangs, I. Suzylawati, P. Cheneviere, and M. Samuel "Preventive Treatment for Enhancing Water Removal from Gas Reservoirs by Wettability Alteration" disclose the use of several chemicals for the improvement of the removal of water blocks in gas reservoirs. Besides fluorine based surfactants and polymers no details about the chemicals tested are provided.

PCT patent application PCT/EP2013/059947 discloses the use of esters of alkoxylated saccharides having esters groups comprising hydrocarbon residues having from 6 to 30 carbon atoms as wettability modifiers. It also mentions the use of such components in fracturing operations for improving the penetration of an aqueous fracturing fluid into the formation, however, the application does not disclose the use of said alkoxylated saccharides as flowback agents.

US 2011/0218126 A1 discloses an environmentally, green, non-toxic composition comprising besides water at least 4 different components, namely (a) water soluble esters of low molecular weight alcohols and of low molecular organic acids, (b) oil soluble esters of low molecular weight alcohols and of high molecular weight fatty acids, (c) water soluble non-ionic surfactants from vegetable or animal sources, and (d) amphoteric surfactants derived from animal or vegetable based sources. Examples for (c) include ethoxylated and/or propoxylated alcohols such as lauryl alcohol, stearyl alcohol, oleyl alcohol or polyglucosides.

It is known in the art to use alkyl polyglucosides for oilfield applications (as disclosed for example in WO 2006/026732 A1, WO 2007/063069 A2 or WO 2011/038745 A1), however it has not yet been known to use them as flowback aids in fracturing operations.

There is still a need for fracturing processes with improved flowback performance in which environmentally acceptable surfactants may be used.

DETAILED DESCRIPTION OF THE INVENTION

Correspondingly, a method of fracturing a subterranean formation penetrated by a wellbore has been found, which at least comprises the steps of (1) formulating an aqueous fracturing fluid,
(2) pumping the fracturing fluid down the wellbore at a rate and pressure sufficient to flow into the formation and to initiate or extend fractures in the formation,
(3) reducing the applied pressure thereby allowing at least a portion of the injected fracturing fluid to flow back from the formation into the wellbore, and
(4) removing such flowed back fracturing fluid from the wellbore, wherein the aqueous fracturing fluid comprises at least
   (F1) alkyl or alkenyl polyglucosides having the formula $R^1O[G]_p$ (I), wherein $R^1$ is an alkyl or alkenyl radical having from 10 to 22 carbon atoms, G is a sugar unit having 5 or 6 carbon atoms and p is a number from 1 to 10,
   (F2) carboxylated alkyl or alkenyl polyglucosides having the formula $R^1O[G]_p(-R^2-COOM)_q$ (II), wherein $R^1$, G and p have the meaning as mentioned above, q is a number from 1 to 3, M is H or an alkali metal ion and $R^2$ is a spacer group,
   (F3) alkoxylated branched alcohols of the general formula $R^3-O-(CH_2-CH(R^4)-O)_n-H$ (III), wherein $R^3$ is a branched alkyl chain having from 8 to 18 carbon atoms, $R^4$ is a group selected from H, methyl or ethyl, and n is a number from 5 to 30, with the proviso that at least 50 mole % of the groups $R^4$ are H,
   (F4) esters of an alkoxylated saccharide having the general formula $Z-(O-C(O)-R^5)_m$ (IV), wherein Z represents the radical of an alkoxylated mono-, di-, or trisaccharide of pentoses and/or hexoses alkoxylated with from 4 to 80 alkylene oxide units selected from the group of ethylene oxide, propylene oxide, or butylene oxide units, with the proviso that at least 50% of the alkylene oxide units are ethylene oxide units, m is a number ≥1, and $R^5$ is an aliphatic linear or branched, saturated or unsaturated hydrocarbon residue having from 6 to 30 carbon atoms.

In a preferred embodiment of the invention, the flowback aid (F3) is derived from a Guerbet alcohol.

In a further preferred embodiment of the invention a mixture comprising at least (F1) and (F3) is used for fracturing.

List of figures:
FIGURE Schematic of Contact Angle (θ) of a droplet with air as the external phase With regard to the invention, the following should be stated specifically:

Aqueous Fracturing Fluid

For the method according to the present invention an aqueous fracturing fluid is used which comprises at least an aqueous base fluid, a proppant, a viscosifier, and a least one flowback aid (F) dissolved in the water. The flowback aids assist in removing the injected fracturing fluid from the formation after a hydraulic fracturing treatment.

Aqueous Base Fluid

The aqueous base fluid for the fracturing fluid comprises water.

Besides water the aqueous formulation may also comprise organic solvents miscible with water. Examples of such solvents comprise alcohols such as ethanol, n-propanol, 1-propanol or butyl diglycol. If organic solvents are present their amount should not exceed 50% by weight with respect to the solvents present in the aqueous base fluid. In a preferred embodiment of the invention the aqueous base fluid comprises at least 70% by weight of water with respect to the solvents present in the aqueous base fluid, more preferably at least 90% by weight. In a further preferred embodiment of the invention only water is used as solvent in the aqueous base fluid.

The aqueous base fluid may comprise dissolved salts. Examples of salts comprise halogenides, in particular chlorides, sulfates, borates of mono- or divalent cations such as $Li^+$, $Na^+$, $K^+$, $Mg^{2+}$, $Ca^{2+}$, $Sr^{2+}$, or $Ba^{2+}$. In a one embodiment of the invention, the aqueous fracturing fluid comprises at least one salt.

Preferably, the salt may be KCl and/or ammonium chloride. The salinity of the water, in particular the concentration of KCl and/or ammonium chloride may be from 0.1% by weight to 10% by weight relating to the aqueous base fluid, in particular from 0.5% to 8% by weight, preferably from 1% to 6% by weight and by the way of example 3 to 5% by weight.

Proppants

The aqueous fracturing fluid furthermore comprises at least one proppant which is suspended in the aqueous fracturing fluid. Proppants are small hard particles which cause that fractures formed in course of the process do not close after removing the pressure. Suitable proppants are known to the skilled artisan. Examples of proppants include naturally-occurring sand grains, resin-coated sand, sintered bauxite, glass beads, or ultra lightweight polymer beads.

The amount of proppants in the aqueous fracturing fluid may be from 50 kg/m³ to 3500 m³/kg of the fracturing fluid, preferably from 50 kg/m³ to 1200 kg/m³ of the fracturing fluid.

Viscosifiers

The aqueous fracturing fluid furthermore comprises at least one viscosifier for increasing the viscosity of the fracturing fluid. Suitable viscosifiers for fracturing fluids are known to the skilled artisan. Viscosifying agents may be water-soluble, thickening polymers, low molecular components such as viscosifying surfactants or combinations thereof.

Examples of polymers comprise biopolymers or modified biopolymers such as xanthans, Scleroglucane, galactomannan gums, cellulose derivatives such as hydroxyethylcellulose, carboxyethylcellulose or carboxymethylcellulose. Examples are disclosed in US 2007/0062702 A1. Further examples comprise synthetic polymers such as poly acrylamide or copolymers comprising acrylamide units such as copolymers of acrylamide and acrylic acid, sufonic acid groups comprising monomers or hydrophobically associating polymers. Polymers may also be used together with suitable crosslinkers.

Examples of low molecular compontents comprise viscosifying surfactants such as the viscoelastic surfactants disclosed in U.S. Pat. No. 5,964,295 or combinations of viscosifying surfactants and polymers such as disclosed in WO 2011/012164 A1. The skilled artisan knows how to select suitable viscosifiers according to his or her needs.

Flowback Aids

The aqueous fracturing fluid used in the method of fracturing according to the invention comprises at least one flowback aid (F). In one embodiment of the invention the flowback aids are selected from the group of flowback aids (F1), (F2), and (F3).

(F1)

The flowback aids (F1) are alkyl or alkenyl polyglucosides having the formula $R^1O[G]_p$ (I).

In formula (I) $R^1$ G is a sugar unit having 5 or 6 carbon atoms and p is a number from 1 to 10. As sugars aldoses and/or ketoses having 5 or 6 carbon atoms may be used. Preferably G is a glucose unit. The index p in general formula (I) indicates the degree of oligomerisation (DP degree), i.e. the distribution of mono- and oligoglycosides. Whereas p for a specific molecule necessarily must always be an integer and, the value p for a certain alkyl or alkenyl oligoglycoside is an analytically determined calculated quantity which is mostly a rational number. Alk(en)yl oligoglycosides having an average degree of oligomerisation p of 1.1 to 3.0 are preferably used, more preferably such with a value p of 1.2 to 1.7.

Furthermore, in formula (I) $R^1$ is an alkyl or alkenyl radical having from 10 to 22 carbon atoms, preferably from 10 to 16 carbon atoms. The alkyl or alkenyl radical $R^1$ may be derived from primary alcohols. Typical examples are decyl alcohol, undecyl alcohol, lauryl alcohol, myristyl alcohol, cetyl alcohol, palmitoleyl alcohol, stearyl alcohol, isostearyl alcohol, oleyl alcohol, elaidyl alcohol, petroselinyl alcohol, arachyl alcohol, gadoleyl alcohol, behenyl alcohol, erucyl alcohol and technical mixtures thereof such as are formed, for example, in the hydrogenation of technical fatty acid methyl esters or in the hydrogenation of aldehydes from Roelen's oxo synthesis. Preferably, $R^1$ may be derived from alcohols of natural sources, e.g. alcohols gained from coconut or palm kernel oils comprising a mixture of $C_{12}$- and $C_{14}$-alcohols as the major components.

In one embodiment of the invention, a mixture of at least two different flowback aids (F1) having different alkyl or alkenyl radicals $R^1$ from 10 to 16 carbon atoms are used. Preferably said mixture comprises at least an alkyl or alkenyl radical $R^1$ having 12 carbon atoms and an alkyl or alkenyl radical having 14 carbon atoms. Such mixtures may be obtained when alcohols of natural sources, e.g. alcohols gained from coconut or palm kernel oils are used.

The manufacture of alkyl or alkenyl polyglucosides is known to the skilled artisan. The may be for instance synthesized by the reaction of an alcohol, a saccharide component and acid catalysts as disclosed in U.S. Pat. No. 5,003,057 or WO 2001/09153 A1. Various types of alkyl or alkenyl polyglucosides are commercially available.

(F2)

The flowback aids (F2) are carboxylated alkyl or alkenyl polyglucosides having the formula $R^1O[G]_p(-R^2-COOM)_q$ (II).

In formula (II) $R^1$, G and p have the meaning as mentioned above. q is a number from 1 to 3, preferably 1 or 2 and more preferable about 1. M is H or an alkali metal ion, such as for example Li. Na or K. With other words, the carboxylic group may be and acidic group —COOH or a salt thereof, for instance a —COONa group. $R^2$ is a spacer group which links the —COOM group with the sugar units and which usually comprises at least one carbon atom.

The carboxylated alkyl or alkenyl polyglucosides are obtainable by reacting alkyl or alkenyl polyg(ucosides of formula (I) with suitable reagents for introducing —COOM groups, for instance ω carboxylic acids. In a preferred embodiment, the alkyl or alkenyl polyglucosides are obtainable by reacting alkyl or alkenyl polyglucosides of formula (I) with
- α halocarboxylic acid, preferably chloracetic acid or its sodium salt,
- α β unsaturated carboxylic acid, preferably (meth)acrylic acid, or
- ride or phthalic acid anhydride.

The nature of the spacer group $R^2$ depends on the agent for introducing the —COOM group. For instance, in case of using α halocarboxylic acids, i.e. carboxylic acids having the general formula R'—CH(Hal)-COOH, wherein R' is a hydrocarbon radical and Hal is a halogen, the spacer group $R^2$ has the formula —CR'H. In one embodiment of the invention the spacer group $R^2$ is an alkylene group —$(CH_2-)_l$, wherein l is a number from 1 to 10. In a preferred embodiment the spacer group is a —$CH_2$— group (a methylene group). Such a spacer group is obtained, when using chloracetic acid or its sodium salt to introduce the carboxylic acid groups.

Suitable methods for making flowback aids (F2) are known to the skilled artisan and for example disclosed in WO 1997/42299 A1, WO 2002/090369 A2, or WO 2004/052902 A1.

(F3)

The flowback aids (F3) are alkoxylated branched alcohols of the general formula $R^3-O-(-CH_2-CH(R^4)-O)_n-H$ (III).

In formula (III) $R^3$ is a branched alkyl chain having from 8 to 18 carbon atoms, preferably from 10 to 18 carbon atoms.

$R^4$ is a group selected from H, methyl or ethyl with the proviso that at least 50 mole % of the groups $R^4$ are H, i.e. at least 50% of the groups —$CH_2$—$CH(R^4)$—O— are ethyleneoxy groups. If different alkoxy groups are present they may be arranged statistically or as a block. Preferably, at least 80 mole % of the $R^4$ groups are H, more preferably at least 90% and most preferrably all $R^4$ are H, i.e. (F3) is an ethoxylated alcohol.

n is a number from 5 to 30, preferably a number from 8 to 20 and even more preferably from 10 to 15. It goes without saying for the skilled artisan that n is an average number and therefore may be a rational number.

$R^3$ may have 1 branching point or more than one branching point. The groups $R^3$ may be derived from Oxo alcohols or from Guerbet alcohols. Guerbet alcohols are branched alcohols known in the art and are manufactured by a Guerbet condensation of lower alcohols thus yielding alcohols branched in 2-position.

In one embodiment of the invention $R^3$ has an even number of carbon atoms and is derived from a Guerbet alcohol. Examples of such groups $R^3$ comprise 2-ethylhexyl-, 2-propylheptyl-, 2-butyloctyl-, 2-pentylnonyl-, and 2-hexyldecyl groups. In a preferred embodiment $R^3$ is a 2-propylheptyl group.

(F4)

In a further embodiment of the invention the flowback aid (F) may also be a flowback aid (F4). The flowback aids (F4) are esters of an alkyoxylated saccharide having the general formula $Z-(-O-C(O)-R^5)_m$ (IV).

In formula (IV) Z represents the radical of an alkoxylated mono-, di-, or trisaccharide of pentoses and/or hexoses alkoxylated with from 4 to 80 alkylene oxide units selected from the group of ethylene oxide, propylene oxide, or butylene oxide units, with the proviso that at least 50% of the alkylene oxide units are ethylene oxide units, m is a number ≥1, and $R^5$ is an aliphatic linear or branched, saturated or unsaturated hydrocarbon residue having from 6 to 30 carbon atoms.

The monosaccharides are pentoses or hexoses, preferably hexoses and in the same manner the units of the di- or trisaccharides are pentose units and/or hexose units, preferably hexose units. Accordingly, the mono-, di-, or trisaccharides contain from 5 to 18 carbon atoms, preferably from 6 to 18 carbon atoms. The monosaccharides may be aldoses and/or ketoses. Preferably, the saccharides are mono- or disaccharides and very preferably, the saccharides are disaccharides.

Examples of suitable mono-, di-, or trisaccharides include monosaccharides such as arabinose, ribose, xylose, glucose, mannose, galactose, fructose, disaccharides such as maltose (2 glucose units), lactose (one galactose unit+one glucose unit) or saccharose (one glucose unit+one fructose unit) or trisaccharides such as maltotriose (3 glucose units).

Preferred saccharides are glucose, saccharose, maltose, and maltotriose and particularly preferred is saccharose.

The mono-, di-, or trisaccharides are alkoxylated with from 4 to 80 alkylene oxide units selected from the group of ethylene oxide, propylene oxide, and butylene oxide units, preferably from the group of ethylene oxide and propylene oxide units, with the proviso that at least 50% of the total number of alkylene oxide units are ethylene oxide units. Preferably, at least 70% and very preferably at least 90% of the alkylene oxide units are ethylene oxide units and in the most preferred embodiment only ethylene oxide units are used. Using other alkylene oxides units besides ethylene oxide units may be used to fine tune the hydrophilicity of the alkoxylated saccharide esters to be used. The alkoxylation products may show a blockwise or statistical distribution of the alkylene oxide units.

Preferably, the mono-, di-, or trisaccharides are alkoxylated with from 8 to 50 alkylene oxide units, more preferably with from 10 to 45 alkylene oxide units and most preferably with from 12 to 40 alkylene oxide units.

Preferably $R^5$ is from 8 to 30 carbon atoms, more preferably from 8 to 22 carbon atoms and most preferably from 12 to 18 carbon atoms. $R^5$ may optionally be substituted by OH-groups. If $R^1$ is an unsaturated aliphatic residue the number of double bonds preferably is from 1 to 3 double bonds. m represents the number of ester groups in the molecule and has a number ≥1. It goes without saying that m cannot exceed the number of OH-groups present in the saccharides used, i.e. in case of a trisaccharide of three hexoses such as maltotriose m cannot exceed 11, in case of a disaccharide of two hexoses saccharose the number cannot exceed 8. In other words, m is from 1 to 11. Preferably, m is from 1 to 4 and most preferably m is 1 or 2.

Examples of ester groups $R^5$—C(O)—O— comprise ester groups derived from lauric acid, myristic acid, palmitic acid, palmoleic acid, stearic acid, isostearic acid, oleic acid, elaidinic acid, linoleic acic, conjugated linoleic acid, linolenic acid, 12-hydroxy stearic acid, ricinoleic acid, gadoleic acid, arachidonic acid, behenic acid, and Erucic acid.

Preferred flow-back aids (F4) for use in the process of the present invention are esters based on alkoxylated saccharose. Preferably, saccharose is alkoxylated with from 8 to 50 ethylene and/or propylene oxide units, more preferably with from 12 to 45 ethylene and/or propylene oxide units and most preferably with from 15 to 40 ethylene oxide and/or propylene units with the proviso that at least 50% of the total number of alkylene oxide units are ethylene oxide units. Preferably, at least 70% and very preferably at least 90% of the alkylene oxide units are ethylene oxide units and in the most preferred embodiment only ethylene oxide units are used. Preferably mono- or diesters are used, i.e. n is 1 or 2, and $R^1$ as defined above has 8 to 22 carbon atoms and more preferably from 12 to 18 carbon atoms.

In one embodiment of the invention the flowback aids (F4) are monoesters of alkoxylated saccharose wherein the alkoxylated saccharose comprises from 15 to 25 ethylene oxide units, for example about 20 ethylene oxide units, and $R^1$ as defined above has 12 to 18 carbon atoms, preferably 16 to 18 carbon atoms, e.g. saccharose*20 EO-monooleate.

In another embodiment of the invention the flowback aids (F4) are diesters of alkoxylated saccharose wherein the alkoxylated saccharose comprises from 25 to 45 ethylene oxide units, for example about 30 to 40 ethylene oxide units, and $R^1$ as defined above has 10 to 18 carbon atoms, preferably 12 to 14 carbon atoms, e.g. saccharose*40 EO dilaurate.

Besides the flowback aids (F) of course further flowback aids (F') chemically different from the flowback aids (F) may be used. In general, at least 50% by weight relating to the total of all flow-back aids used, preferably at least 80%, and more preferably at least 95% of the flowback aids used should be flowback aids (F). In one embodiment of the invention only flowback aids (F) are used.

The total amount of the flowback aids (F) used is from 0.01% by weight to 10% by weight, relating to the aqueous base fluid, preferably from 0.01% to 1% and more preferably from 0.02% to 0.5%.

Further Components

The aqueous fracturing fluid may comprise optionally further components. Such further components may be acids, biocides, buffers, clay stabilizers, corrosion inhibitors, defoamers, non-emulsifying agents, scale inhibitors, oxygen scavengers, thickening polymers, crosslinkers, friction reducers, breakers or co-surfactants. Examples of co-surfactants which may be used together with alk(en)yl polyglucosides or modifier alk(en)yl polyglucosides comprise alkyl-alkoxy-sulfates, alkyl-alkoxycarboxylates, alkyl-alkoxy-sulfonates, alkyl-amines or betains. The skilled artisan may select such further depending on the needs of the frac job.

The flowback aids (F) may be formulated as a concentrate which may then be used to make the ready for use fracturing fluid. In one embodiment such a formulation may comprise 15 to 25% flowback aids (F), 10 to 30% organic solvents, such as methanol or isopropanol, 5 to 15% mutual solvent such as 2-butyl glycol, and 25 to 65% of water. All percentages are by weight.

In a further embodiment of the invention such a concentrate may be winterized, preferably to temperatures of −40° C. Such winterized formulations may comprise 20 to 40% of flowback aids (F), 5 to 30% of organic solvents such as methanol or isopropanol and/or 5 to 40% of clay stabilizers such as choline chloride or choline formate and/or ionic liquids. All percentages are by weight.

Method of Fracturing

The method of fracturing a subterranean formation according to the present invention may be applied to any subterranean formation, preferably hydrocarbon containing subterranean formations. The hydrocarbons may be oil and/or gas. Besides oil and/or gas the formations may contain water which usually comprises salts. The salinity of the formation water may be for instance from 10,000 ppm to 230,000 ppm.

The formations may be sandstone, carbonate or shale formations and the formation temperature may be up to 175° C.

For applying the method according to the present invention to the formation, the formation is penetrated by at least one wellbore. The wellbore may be a "fresh" wellbore drilled into the formation which needs to become prepared for oil and/or gas production. In another embodiment the wellbore may be a production well which already has been used for producing oil and/or gas but the production rate decreased and it is necessary to fracture the formation (again) in order to increase production.

The method according to the present invention comprises at least 4 process steps (1), (2), (3), and (4). The method may optionally comprise further process steps.

In course of process step (1) an aqueous fracturing fluid comprising at least an aqueous base fluid, a proppant, a viscosifier, at least a flowback aid (F) and optionally further components is formulated.

In general, the components of the fracturing fluid are mixed at the surface using conventional equipment and techniques.

In one embodiment, a concentrated solution of the flowback aids (F) such as a concentrate as indicated above may be used and may be added to aqueous base fluid to achieve the final desired concentrations. The viscosifier and optionally further components are also to the aqueous base fluid. The components may be added in any order. The fluid is then thoroughly mixed and a proppant is added. The specific composition of the aqueous fracturing fluid and the concentrations of the components used are chosen by the skilled artisan according to the needs of the frac job.

In course of process step (2) the fluid pumped into a wellbore at a rate and pressure sufficient to flow into the formation and to initiate or extend a fracture in the formation. In order to initiate or to extend fractures in the formation a bottomhole pressure sufficient to open a fracture in the formation is necessary. The bottomhole pressure is determined by the surface pressure produced by the surface pumping equipment and the hydrostatic pressure of the fluid column in the wellbore, less any pressure loss caused by friction. The minimum bottomhole pressure required to initiate and/or to extend fractures is determined by formation properties and therefore will vary from application to application. Methods and equipment for fracturing procedures are known to the skilled artisan. The fluid simultaneously transports suspended proppants and the proppant becomes deposited into the fractures and holds fractures open after the pressure exerted on the fracturing fluid has been released.

In course of process step (3) the applied pressure is reduced thereby allowing at least a portion of the injected fracturing fluid to flow back from the formation into the wellbore. Reducing the pressure allows the fractures to close. Proppant "props" fractures open and fracturing fluid is shut in or allowed to flow back. At the surface, chokes may be used to generate a pressure differential to allow fluid to begin to flow from the formation into the well bore.

The flowback aids (F) used in the fracturing fluid significantly facilitate the removal of the fracturing fluid injected. They minimize the amount of retention of water and the amount of water trapped in the wellbore from the formation and increase the amount of fluid recovered. The addition of flow-back aids (F) improves the fluid recovery and improves the regain permeability. Without wishing to be bound by theory we believe that this may be because the flowback aids (F) used according to this invention minimize capillary pressure, however, the experimental results summarized below results demonstrate that a minimized capillary pressure alone is not sufficient to explain the recovery improvement when using the flowback aids (F) in a method of fracturing but other factors also seem to be important.

In course of step (4) the aqueous fracturing fluid flown back from the formation into the wellbore is removed from the wellbore. It goes without saying for the skilled artisan that the aqueous fracturing fluid recovered may not longer have exactly the same composition as he injected fluid but may be mixed with formation fluids such as oil and/or formation water.

The total amount of fluid recovered usually depends on the formation, for instance on how much water the formation adbsorbs and absorbs into its structure. Additonally, fluid may be lost to the formation. By the way of example in shale formations only 10 to 30% of the injected aqueous fracturing fluid may be recovered. The addition of the flowback aids (F) used according to the invention enhances the amout of fluid recovered compared to using a fracturing fluid in which the flowback aids (F) are not present.

Water that is not recovered from the formation can result in phase-trapping or water block. It may result in formation damage i.e. reduced productivity of the well. The flowback aids (F) serve to avoid such problems.

Due to their their excellent performance in improving fluid recovery, the flowback aids (F) are very good substitutes for flowback aids known in the state in the art.

The examples which follow are intended to illustrate the invention in detail:

Materials:

The following surfactants were tested:

| No. | Type | Chemical description |
|---|---|---|
| Surfactant A | anionic alkyl polyglucoside | Carboxymethylated $C_{10-16}$ alkyl polyglucoside (sodium salt) on basis of coconut/palm kernel oil (main components: about 65-75% by wt. $C_{12}$, 22-30% by wt. $C_{14}$) |
| Surfactant B | non-ionic alkyl polyglucoside | $C_{10-16}$ alkyl polyglucoside (based on D-glucopyranose, around 1.4 glucopyranose units per molecule, main components: $C_{12}$ and $C_{14}$ alkyl residues) |
| Surfactant C | non-ionic alkyl polyglucoside | $C_{10}$ alkyl polyglcucoside |
| Surfactant D | non-ionic alkyl ethoxylate | 2-propylheptanol, ethoxylated with 14 EO units |
| Surfactant E | anionic alkyl propoxylate | 2-propylheptanol, propoxylated, terminal COOH-group (sodium salt) |
| Surfactant F | non-ionic alkyl ethoxylate | 2-propylheptanol, ethoxylated with 4 EO units |
| Surfactant G | anionic surfactant | L-Glutamic acid, N-coco acyl derivative, disodium salt |
| Surfactant H | Non-ionic surfactant | poly propylene oxide, average $M_w$ 3200 g/mole |
| Surfactant J | anionic surfactant | sodium dodecylsulfate |

The surfactants in this study were evaluated at a loading of 0.1% by wt. in various base fluids. Base fluids used were, City of Houston tap water, 2% KCl and 7% KCl brines. Brines were prepared using City of Houston Tap Water as the base fluid and analytical grade potassium chloride (KCl).

Application Tests:
Interfacial Characterization:

The surfactants were characterized by measurements of surface tension (ST), interfacial tension (IFT) and contact angle.

Surface Tension (ST)

ST is the measurement of the contractive tendency of a liquid droplet in an air interface that allows it to resist an external force. Surface tension measurements were recorded using a Ramé-Hart Goniometer and DROPimage software. The method utilized the pendant drop method for measuring surface tension. The drop dimensions and profile characteristics were recorded and the surface tension of the liquid calculated using the Young-Laplace equation. The accuracy of this method is ±1%. For brevity, interfacial tension was only repeated for those fluids which showed a surface tension below 40 mN/m.

Interfacial Tension

Interfacial tension of the aqueus surfactant solutions were evaluated in a high purity, high boiling synthetic isoparaffin hydrocarbon solvent such as (Isopar® L from ExxonMobil).

The isoparaffin is used a model compound for crude oil. The interfacial tension was also measured using a Ramé-Hart Goniometer.

Contact Angle

Figure 1:
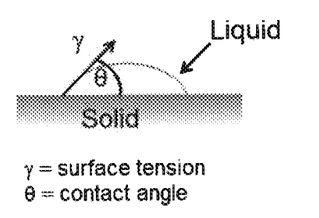

The contact angle is defined as the angle (8) formed between the liquid-vapor and the liquid/solid interface (see FIGURE). Contact angle measurements were recorded using the Rame-Hart Goniometer and the DROPimage software, the accuracy of this method is usually ±2 degrees. Contact angle measurements for all samples were taken on Quartz slides. All measurements were made with 4 μL drops and contact angle measurements were taken every second for one minute. A minimum of three contact angle measurements were taken for each surface and the average of these measurements were reported.

Sand Column Fluid Recovery Testing:

Sand packed columns are used to simulate fluid recovery in a proppant pack. The effects of the reduction in capillary pressure can be observed by determining amount of fluid that can be recovered from the sand column. Base fluid without any surfactant is tested in the column and the fluid recovery observed is used as a baseline to evaluate improvement in fluid recovery with the addition of the surfactants.

The tests were performed according to the method described by Cawiezel et al. (K. E. Cawiezel, A. K. Singh, P. S. Carman, J. L. Cutler, "*The Selection and Optimization of a Surfactant Package to Maximize Cleanup of a High-Density Fracturing Fluid*" in SPE 136812-MS 2010, SPE Deepwater Drilling and Completions Conference, Galveston).

Samples of 40/70 Ottawa sand and 100 mesh fracturing sand from Unimin were used for the sand column tests. A sand splitter was used to split the sand and individual sand samples weighing approximately 175 g-185 g were prepared to pack the column.

The Plexiglas® column used is 0.203 m long with a 0.0254 m internal diameter. Each end cap has a 600 mesh screen to prevent the sand pack from plugging the line. 200 mL sample of the base fluid with 0.1 wt. % of surfactant was prepared. 38 mL of the sample were then added into the empty column. The sand was packed into the column by adding slowly while mixing using a high speed vortex mixer until the column was topped-off. Nitrogen gas was used to apply pressure and pump the aqueous solution through the column, which would mimic reservoir gas in the field forcing fracturing fluid through the formation. Calibrated flow meters were used to verify the flow rate of the aqueous solution before each test. Fluids were tested with 40/70 and 100 mesh sand samples at a gas flow rate of 20 cm$^3$/min. An electronic lab balance and LabView™ data collection software were used to record the weight of the fluid collected from the sand column. Density of the fluid tested was recorded with a densitometer and the volume of fluid recovered was calculated from the mass values recorded during testing. Each of the surfactant concentrations were tested four times and the average was reported. A test was deemed complete when a minimal change in fluid recovery was observed (less than 0.2 g in 15 minutes). The tests were performed at room temperature.

Regain Permeability Test Procedure:

Regain permeability is used to assess the clean-up of fracturing fluids and the impact of surfactants on relative permeability. Regain is measured when another type of fluid (different from the saturating fluid), surfactant, polymer, etc., is introduced. A core sample is saturated with the base fluid and loaded into a core holder and a confining stress is applied. Then flow of mineral oil is used to establish permeability to oil ($k_o$) at irreducible water saturation ($S_{wi}$). Treatment fluid is then injected into the core. After treatment, flow of oil is re-established and $k_{oSwi}$ is established. In this approach, if the final $k_oS_{wi}$ is lower, then the treating fluid is damaging.

Nugget formation sandstone core samples from Utah with a permeability of 20 to 30 mD were used in this study. The samples were dried to stable weights and pore volume and porosity were determined. Mineralogy of the core samples was as follows: 92% Quartz, 5% K-feldspar, 1% plag, and 2% ilite/mica clays.

Each sample was saturated under vacuum with 7% KCl brine then loaded into a preheated Hassler-load cell at 149° C. and confining stress was applied. Additional 7% KCl brine was injected at a constant rate against back pressure to ensure full water saturation. Irreducible water saturation was established by oil flow at a constant rate against back pressure with isoparaffinic oil. Flow direction was an standard formation-to-wellbore designation. Differential pressure was monitored continuously and effective initial permeability to oil at irreducible water saturation ($k_{oSwi}$) was calculated. This value served as the baseline comparison to after-treatment (i.e. exposure of surfactants) values.

Ten pore volumes (PV) of the fluid with the surfactant were injected against back pressure in the wellbore-to-formation direction. After a one hour shut-in, oil flow was re-established in the formation-to-wellbore direction. Flow rate and differential pressure were monitored, recorded, and final $K_{oSwi}$ was calculated.

Results and Discussion

The results of surface tension, interfacial tension, contact angle and fluid recovery measurements for solutions of the surfactants in tap water (0.1% by wt.) at room termperature are summarized in table 1.

TABLE 1

Results of surface tension, interfacial tension and contact angle measurements, capillary pressure and flid recovery (NA: data not available)

| Surfactant | Surface tension [mN/m] | Interfacial tension [mN/] | Contact angle on quartz [θ | Fluid recovery [%] | Capillary pressure [Pa] |
|---|---|---|---|---|---|
| Freshwater | 72.4 | 37.7 | 33.1 | 10 | 171661 |
| Surfactant A | 29.7 | 2.7 | 19.3 | 89 | 79281 |

TABLE 1-continued

Results of surface tension, interfacial tension and contact angle measurements, capillary pressure and flid recovery (NA: data not available)

| Surfactant | Surface tension [mN/m] | Interfacial tension [mN/] | Contact angle on quartz [θ] | Fluid recovery [%] | Capillary pressure [Pa] |
|---|---|---|---|---|---|
| Surfactant B | 29.7 | 0.4 | 17.4 | 89 | 79970 |
| Surfactant C | 30.6 | 7.7 | 17.1 | 87 | 82728 |
| Surfactant D | 30.9 | 8.3 | 13.5 | 83 | 84796 |
| Surfactant E | 38.8 | 30.0 | 21.7 | 52 | 102031 |
| Surfactant F | 26.7 | 11.7 | 7.5 | 14 | 75145 |
| Surfactant G | 50.0 | 13.7 | 35.8 | NA | 114440 |
| Surfactant H | 42.1 | 17.6 | 34.0 | NA | 98584 |
| Surfactant J | 42.6 | 27.7 | 36.5 | 64 | 97205 |
| Surfactant B + Surfactant D (60:40 by wt.) | 28.5 | 1.3 | 14.1 | NA | 77902 |

Table 1 shows that for Surfactants A (anionic alkyl polyglucoside), B ($C_{10-16}$ alkyl polyglucoside), C ($C_{10}$ alkyl polyglucoside), D (2-propylheptanol*14 EO), F (2-propylheptanol*4 EO) as well as the 60:40 mixture of Surfactants B and D surface tensions below 31 mN/m were found.

For the surfactants A, B, C, D, and the 60:40 mixture of Surfactants B and D interfacial tension below 10 mN/m were found. Although the surface tension for surfactant F is the lowest of all surfactants tested its interfacial surface tension (i.e. for the surface tension between the aqueous surfactant solution and isoparaffin) is 11.7 mN/m.

For the Surfactants A, Surfactant B, Surfactant D, Surfactant F as well as the 60:40 mixture of Surfactant B and D contact angles below 20° were found. The lowest value is that of surfactant F having a contact angle of only 7.5°. So, the skilled artisan might expect surfactant F to be a good candidate for fluid recovery. Surprisingly however, the fluid recovery using a solution of surfactant F is only poor as compared to the similar surfactant D. So, the ethoxylation degree seems to play an important role for that type of surfactants.

Fluid recovery test results of the surfactants (0.1% by wt.) in freshwater, 2% brine and 7% brinein a 40/70 sand column are shown in Table 2. No solubility issues were observed with the surfactants in the KCl fluids. With increasing KCl concentration, a decrease in fluid recovery was observed. Surfactant A maintained the highest fluid recovery with approximately 85% fluid recovery in 2% to 7% KCl base fluids.

TABLE 2

Fluid recovery results in a 40/70 sand column with surfactants in tapwater, 2% and 7% KCl.

| | | Average recovery [%] | | |
|---|---|---|---|---|
| Surfactant | Chemistry | freshwater | brine 2% KCl | brine 7% KCl |
| — | Water | 9.5 | 9.0 | 13.3 |
| Surfactant A | anionic $C_{10-16}$ alkyl polyglucoside | 88.9 | 86.3 | 84.6 |
| Surfactant B | $C_{10-16}$ alkyl polyglucoside | 88.5 | 82.4 | 81.5 |
| Surfactant C | $C_{10}$ alkyl polyglucoside | 87.1 | 73.4 | 76 |
| Surfactant D | 2-propylheptanol*14 EO | 82.9 | 78.1 | 80.9 |

The data in table 2 demonstrate that with increasing KCl concentration, a decrease in fluid recovery is observed. Surfactant A maintained the highest fluid recovery with approximately 85% fluid recovery in 2% to 7% KCl base fluids. Also the length of the alkyl chain influences the results in brines. While there is no significant difference between the performance of surfactants B ($C_{10-16}$ alkyl polyglucoside) and C ($C_{10}$ alkyl polyglucoside) in freshwater the average recovery in 2% brine is significantly lower when using surfactant C.

For surfactants A, B, D, and mixtures thereof (the total of the surfactants always was 0.1% by wt.) further fluid recovery tests were performed in a 100 mesh sand column in a 7% KCl base fluid. The results are summarized in table 3.

TABLE 3

Fluid recovery results in 100 mesh sand column and 0.1 wt. % surfactant solutions comprising 7% KCl.

| Surfactant | Chemistry | Average recovery [%] | Standard deviation |
|---|---|---|---|
| — | Water + KCl | 32.0 | +/−6.9 |
| Surfactant A | anionic $C_{10-16}$ alkyl polyglucoside | 77.2 | +/−5.0 |
| Surfactant B | $C_{10-16}$ alkyl polyglucoside | 72.5 | +/−0.9 |
| Surfactant D | 2-propylheptanol*14 EO | 82.0 | +/−0.4 |
| Surfactant A + Surfactant D (70:30 by wt.) | anionic $C_{10-16}$ alkyl polyglucoside + 2-propylheptanol*14 EO | 75.6 | +/−2.3 |
| Surfactant B + Surfactant D (70:30 by wt.) | $C_{10-16}$ alkyl polyglucoside + 2-propylheptanol*14 EO | 79.8 | +/−2.3 |
| Surfactant B + Surfactant D (60:40 by wt.) | $C_{10-16}$ alkyl polyglucoside + 2-propylheptanol*14 EO | 83.8 | +/−2.4 |

The results of table 3 demonstrate that all surfactants tested showed a 30% improvement in fluid recovery over the baseline tests of the 7% KCl brine with no surfactant. Surfactant D (2-propylheptanol*14 EO) showed the highest improvement in fluid recovery with a 50% improvement over the baseline. No significant reduction in fluid recovery was observed between 40/70 and 100 mesh sand. The best results were obtained with a 60:40 by wt. mixture of Surfactants B and D.

Results of Regain Permeability Tests

The 60:40 mixture of Surfactant B (non-ionic alkyl polyglucoside) and Surfactant D (2-propylheptanol*14 EO) (total surfactant concentration 0.1% by wt.) were used for a regain oil permeability test. The results are summarized in table 4.

TABLE 4

Regain Oil Permeability Results on Nugget Sandstone Core.

| | Permeability [mD] | | |
|---|---|---|---|
| Surfactant | $k_{oSwi}$ initial | $k_{oSwi}$ final | Percent regain |
| Surfactant B + Surfactant D (60:40 by wt.) | 27.5 | 25.1 | 90% |

The invention claimed is:

1. A method of fracturing a subterranean formation penetrated by a wellbore, the method comprising:
   formulating an aqueous fracturing fluid;
   injecting the fracturing fluid down the wellbore at a rate and applied pressure sufficient for the fluid to flow into the formation and to initiate or extend fractures in the formation;

reducing the applied pressure in the injected fluid so at least a portion of the injected fracturing fluid flows back from the formation and into the well bore; and removing the fracturing fluid that flowed back into the wellbore from the wellbore;

wherein the aqueous fracturing fluid comprises;

an aqueous base fluid, a proppant, a viscosifier, and a mixture of flowback aids (F) including at least one flowback aid (F1), which is an alkyl or alkenyl polyglucosides having the general formula $R^1O[G]_p$ (I), wherein $R^1$ is an alkyl or alkenyl radical having from 10 to 22 carbon atoms, G is glucose, and p is a number from 1 to 10, and at least one flowback aid (F3), which is an alkoxylated branched alcohol having the general formula $R^3$—O—$(CH_2$—$CH(R^4)$—$O)_n$—H (III), wherein $R^3$ is a branched alkyl radical having from 8 to 18 carbon atoms, and $R^3$ of flowback aid (F3) has an even number of carbon atoms and is derived from a Guerbet alcohol, or $R^3$ of the flowback aid (F3) is derived from an oxo alcohol, $R^4$ is a group selected from H, methyl or ethyl, and n is a number from 5 to 30, with the proviso that at least 50 mole % of the groups $R^4$ are H, wherein, the mixture includes the at least one (F1), and the at least one (F3), flowback aids in a weight ratio (F1):(F3) of from 1:10 to 10:1.

2. The method according to claim 1, wherein $R^1$ is an alkyl or alkenyl radical having from 10 to 16 carbon atoms.

3. The method according claim 2, wherein the aqueous fracturing fluid includes at least two of the flowback aids (F1) each aid having a different alkyl or alkenyl radical $R^1$.

4. The method according to claim 3, wherein the one flowback aid (F1) has an alkyl or alkenyl radical $R^1$ having 12 carbon atoms and the other flowback aid (F1) has an alkyl or alkenyl radical having 14 carbon atoms.

5. The method according claim 1, wherein $R^3$ of flowback aid (F3) is a branched alkyl radical having from 10 to 18 carbon atoms.

6. The method according to claim 1, wherein $R^3$ of flowback aid (F3) is derived from a Guerbet alcohol and is a 2-propylheptyl radical.

7. The method according to claim 1, wherein $R^3$ of flowback aid (F3) is derived from a Guerbet alcohol and n is a number from 8 to 20.

8. The method according to claim 1, wherein the mixture of flowback aids further includes at least one flowback aid (F2), wherein (F2) is a carboxylated alkyl or alkenyl polyglucoside having the general formula $R^1O[G]_p(—R^2—COOM)_q$ (II), wherein $R^1$ is an alkyl or alkenyl radical having from 10 to 22 carbon atoms, G is glucose, p is a number from 1 to 10, q is a number from to 3, M is H or an alkali metal ion and $R^2$ is —$(CH_2)_l$—, where l is an integer from 1 to 10.

9. The method according to claim 1, wherein the amount of all flowback aids (F) is from 0.01% by wt. to 10% by wt. relative to the aqueous base fluid.

10. The method according to claim 1, wherein the fracturing fluid furthermore comprises dissolved salts.

11. The method according to claim 10, wherein the amount of dissolved salts is from 0.1% by wt. to 10% by wt. relative to the aqueous base fluid.

12. The method according to claim 10, wherein the salt comprises KCl and/or ammonium chloride.

13. The method according to claim 1, wherein the proppant is present at a concentration of from 50 kg/m³ to 3500 kg/m³ of the fracturing fluid.

14. The method according to claim 1, wherein the aqueous fracturing fluid further comprises at least one flowback aid (F2) and/or F(4), wherein (F2) is a carboxylated alkyl or alkenyl polyglucoside having the general formula $R^1O[G]_p(—R^2—COOM)_q$ (II), wherein $R^1$ is an alkyl or alkenyl radical having from 10 to 22 carbon atoms, G is glucose, and p is a number from 1 to 10, q is a number from 1 to 3, M is H or an alkali metal ion and $R^2$ is a methylene group —$(CH_2)_l$—, wherein l is an integer from 1 to 10, and (F4) is an ester of an alkoxylated saccharide having the general formula Z—(O—C(O)—$R^5)_m$ (IV), wherein Z represents the radical of an alkoxylated mono-, di-, or tri-saccharide of pentoses and/or hexoses, which are alkoxylated with from 4 to 80 alkylene oxide units selected from ethylene oxide, propylene oxide, or butylene oxide units, with the proviso that at least 50% of the alkylene oxide units are ethylene oxide units, m is a number ≥1, and $R^5$ is an aliphatic linear or branched, saturated or unsaturated, hydrocarbon residue having from 6 to 30 carbon atoms.

15. The method according to claim 1, wherein $R^3$ of flowback aid (F3) is derived from a guerbet alcohol, and is 2-propylheptyl radical, and n is a number from 8 to 20.

16. A method of fracturing a subterranean formation penetrated by a wellbore, the method comprising:

formulating an aqueous fracturing fluid;

injecting the fracturing fluid down the wellbore at a rate and applied pressure sufficient for the fluid to flow into the formation and to initiate or extend fractures in the formation;

reducing the applied pressure in the injected fluid so at least a portion of the injected fracturing fluid flows back from the formation and into the wellbore; and removing the fracturing fluid that flowed back into the wellbore from the wellbore; wherein the aqueous fracturing fluid comprises;

an aqueous base fluid, a proppant, a viscosifier, and a mixture of flowback aid (F) selected from the group consisting of (F1) alkyl or alkenyl polyglucosides having the general formula $R^1O[G]_p$ (I), wherein $R^1$ is an alkyl or alkenyl radical having from 10 to 22 carbon atoms, G is glucose, and p is a number from 1 to 10, (F2) carboxylated alkyl or alkenyl polyglucosides having the general formula $R^1O[G]_p(—R^2—COOM)_q$ (II), wherein $R^1$ is an alkyl or Acetyl radical having from 10 to 22 carbon atoms, G is glucose, and p is a number from 1 to 10, q is a number from 1 to 3, M is H or an alkali metal ion and $R^2$ is a methylene group —$(CH_2)_l$—, wherein l is an integer from 1 to 10, (F3) alkoxylated branched alcohols having the general formula $R^3$—O—$(CH_2$—$CH(R^4)$—$O)_n$—H (III), wherein $R^3$ is a branched alkyl radical having from 8 to 18 carbon atoms, $R^4$ is a group selected from H, methyl or ethyl, and n is a number from 5 to 30, with the proviso that at least 50 mole % of the groups $R^4$ are H, and (F4) esters of an alkoxylated saccharide having the general formula Z—(O—C(O)—$R^5)_m$ (IV), Wherein Z represents the radical of an alkoxylated mono-, di-, or tri-saccharide of pentoses and/or hexoses, which are alkoxylated with from 4 to 80 alkylene oxide units selected from ethylene oxide, propylene oxide, or butylene oxide units, with the proviso that at least 50% of the alkylene oxide units are ethylene oxide units, m is a number ≥1, and $R^5$ is an aliphatic linear or branched, saturated or unsaturated hydrocarbon residue having from 6 to 30 carbon atoms, wherein the mixture of flowback aid (F) includes at least one (F1), and at least one (F3), in a weight ratio (F1):(F3) of from 1:10 to 10:1, and $R^3$ of the flowback aid (F3) is derived from a Guerbet alcohol and has an even number of carbon atoms of from 10 to 18, or $R^3$ of the flowback aid (F3) is derived from an oxo alcohol.

17. The method according to claim 16 wherein the total amount of flowback aid (F) is from 0.01% by wt. to 10% by wt. relative to the aqueous base fluid, and the fracturing fluid furthermore comprises dissolved salts selected from KCl, ammonium chloride, or a mixture thereof, and the amount of dissolved salts is from 0.1% by wt. to 10% by wt. relative to the aqueous base fluid.

18. The method according to claim 17, wherein the proppant is present at a concentration of from 50 kg/m³ to 1200 kg/m³ of the fracturing fluid.

19. A method of fracturing a subterranean formation penetrated by a wellbore, the method comprising:
formulating an aqueous fracturing fluid;
injecting the fracturing fluid down the wellbore at a rate and applied pressure sufficient for the fluid to flow into the formation and to initiate or extend fractures in the formation;
reducing the applied pressure in the injected fluid so at least a portion of the injected fracturing fluid flows back from the formation and into the wellbore; and
removing the fracturing fluid that flowed back into the wellbore from the wellbore;
wherein the aqueous fracturing fluid comprises;
an aqueous base fluid, a proppant, a viscosifier, and a mixture of flowback aids (F) consisting essentially of at least one flowback aid
(F1), which is an alkyl or alkenyl polyglucosides having the general formula, $R^1O[G]_p$ (I), wherein $R^1$ is an alkyl or alkenyl radical having from 10 to 22 carbon atoms, G is glucose, and p is a number from 1 to 10, and at least one flow back aid
(F3), which is an alkoxylated branched alcohol having the general formula, $R^3-O-(CH_2-CH(R^4)-O)_n-H$ (III), wherein $R^3$ is a branched alkyl radical having from 8 to 18 carbon atoms and is derived from a guerbet alcohol, $R^4$ is a group selected from H, methyl or ethyl, and n is a number from 8 to 20, with the proviso that at least 50 mole % of the groups $R^4$ are H, wherein the mixture includes the at least one (F1), and the at least one (F3), flowback aids in a weight ratio (F1):(F3) of from 1:10 to 10:1.

20. The method according to claim 19, wherein the at least one flowback aid (F1) is a $C_{10-16}$ alkyl polyglucoside), or a $C_{10}$ alkyl polyglucoside), and the weight percent amount of the flowback aid (F1) to the amount of flowback aid (F3) is in a range from 70:30 to 60:40.

* * * * *